United States Patent [19]

Nakagaki et al.

[11] Patent Number: 5,285,268
[45] Date of Patent: Feb. 8, 1994

[54] PROJECTION TYPE DISPLAY DEVICE HAVING A MASK FOR CUTTING OFF UNNECESSARY LIGHT PARTS OF DISPLAYED PICTURE

[75] Inventors: Shintaro Nakagaki, Miura; Ichiro Negishi; Tetsuji Suzuki, both of Yokosuka; Fujiko Tatsumi, Yokohama; Ryusaku Takahashi, Yokosuka; Hiroyuki Bonde, Yokohama; Tsutomu Matsumura, Yokosuka, all of Japan

[73] Assignee: Victor Company of Japan, Ltd., Yokohama, Japan

[21] Appl. No.: 988,208

[22] Filed: Dec. 9, 1992

Related U.S. Application Data

[63] Continuation-in-part of Ser. No. 913,445, Jul. 14, 1992.

[30] Foreign Application Priority Data

Dec. 10, 1991 [JP] Japan .................. 3-350115

[51] Int. Cl.$^5$ .......................... H04N 5/72; H04N 9/31
[52] U.S. Cl. .............................. 348/760; 359/40; 348/842
[58] Field of Search .............. 358/61, 60, 62, 63, 358/231-234, 236, 237, 140; 359/40, 39, 41, 87; H04N 5/72, 5/74, 9/31, 7/01

[56] References Cited

U.S. PATENT DOCUMENTS

| | | | |
|---|---|---|---|
| 4,351,589 | 9/1982 | Chavel et al. | 359/41 |
| 4,453,178 | 6/1984 | Miyatake et al. | 358/60 |
| 4,760,455 | 7/1988 | Nagashima | 358/242 |
| 4,772,101 | 9/1988 | Liu | 359/41 |
| 4,850,685 | 7/1989 | Kamakura et al. | 358/61 |
| 5,062,692 | 11/1991 | Marui et al. | 359/40 |
| 5,130,826 | 7/1992 | Takanashi et al. | 358/61 |

FOREIGN PATENT DOCUMENTS

| | | | |
|---|---|---|---|
| 01086682 | 3/1989 | Japan | H04N 5/74 |
| 02127882 | 5/1990 | Japan | H04N 5/74 |

*Primary Examiner*—James J. Groody
*Assistant Examiner*—Safet Metjahic
*Attorney, Agent, or Firm*—Michael N. Meller

[57] ABSTRACT

A display device of projection type capable of projecting an image with well defined image frame is disclosed. The device comprises 3 spatial light modulators on which color image information is written in 3 primary colors respectively and is read out as a combined optical color image in a form of light beam, the light beam is then projected out of the display device through lens groups for forming a projected image on a screen, the device further comprises a mask disposed in a proximity of an imaginary image formation plane arranged to locate in a vicinity of one of the lens groups, the light beam is caused to form an optical image on the imaginary image formation plane. The mask has a variable light shielding configuration controlled either electronically or electro-mechanically for cutting off unnecessary light portions of the light beam carrying the optical image so that an image of high contrast and well defined clear fringe is projected on the screen.

4 Claims, 4 Drawing Sheets

PROJECTION TYPE DISPLAY DEVICE HAVING A MASK FOR CUTTING OFF UNNECESSARY LIGHT PARTS OF DISPLAYED PICTURE

The present invention relates to a projection type display device such as an image projector and a television projector and the present application is a Continuation-In-Part Application of U.S. patent application Ser. No. 913,445 filed on Jul. 14, 1992 and assigned to the assignee of the present application.

BACKGROUND OF THE INVENTION

1. Field of the Invention:

Particularly, the present invention relates to a device capable of projecting an image, a frame of which is made variable on the screen depending on an aspect ratio of the image to be displayed.

2. Description of the Related Art:

FIG. 1 shows a construction of an image projector disclosed in the U.S. patent application Ser. No. 913,445. The image projector shown in FIG. 1 is constituted mainly with a spatial light modulator 1 for forming a red image, a spatial light modulator 2 for forming a green image, a spatial light modulator 3 for forming a blue image, a color combining optical system 4, a first lens group 5, a second lens group 6, a third lens group 7 and a screen 8.

In the reproduction of image by this prior art display device, a reading light from a light source which is not shown is separated through a polarizing beam splitter and dichroic mirrors, etc., to monochromatic red, green and blue lights and supplied to the respective spatial light modulators 1, 2 and 3. Then, images formed on the respective spatial light modulators 1, 2 and 3 are directed to the color combining optical system 4 and combined thereby and the combined image is focused through the first lens group 5 on the second lens group 6. The focused image on the second lens group 6, is passed to the third lens group 7 through which it is projected onto the screen 8 as an image of a predetermined magnifying power.

According to this image projector, it is possible to make a back focal length larger to thereby minimize the thickness or depth of image projector and to obtain an image of high resolution.

It has been known that, with the use of such spatial light modulators of image (light) writing type, it is possible to wright an input image while arbitrarily varying its frame size, configuration or aspect ratio of writing image according to the original form of the input image.

However, since reading light from a light source irradiates uniformly and fully an effective area (area available for writing in or reading out) inherent to the spatial light modulator, unnecessary areas outside the formed image on the spatial light modulator are also irradiated by the reading light resulting in too bright presentation of such unnecessary areas on the screen, this deficiency is aggravated by the reading light reflected from a substrate surface of each spatial light modulator and reaching to the screen so that a frame or fringe of the projected image becomes unclear.

In such a case, it is conceivable that a contrast of an image area to a periphery thereof may be improved by cutting unnecessary light by means of an aperture member composed of a light shielding plate having a predetermined aperture formed therein.

When such aperture member is provided as a fixed structure, there is a problem that it can not respond to an input image whose frame is, for example, larger than a size of the predetermined aperture, resulting in that even necessary area of the image is cut off.

SUMMARY OF THE INVENTION

Therefore, an object of the present invention is to provide a display device of projection type which includes a mask for cutting off only unnecessary bright periphery of a projected image on a screen.

In order to achieve the above object, the display device of the present invention comprises spatial light modulators on which color image information is written in primary colors respectively and is read out as a combined optical color image in a form of light beam, the light beam is then projected out of the display device through lens groups for forming a projected image on a screen, the device further comprises an imaginary image formation plane arranged in a vicinity of one of the lens groups, the light beam forming an image on the imaginary image formation plane, a mask disposed in a proximity of the imaginary image formation plane. The mask has a variable light shielding configuration controlled either electronically or electro-mechanically for cutting off unnecessary light portions of the light beam carrying the optical image so that an image of high contrast and well defined clear fringe is projected on the screen.

DETAILED DESCRIPTION OF THE PREFERRED EMBODIMENTS

Figure 1:
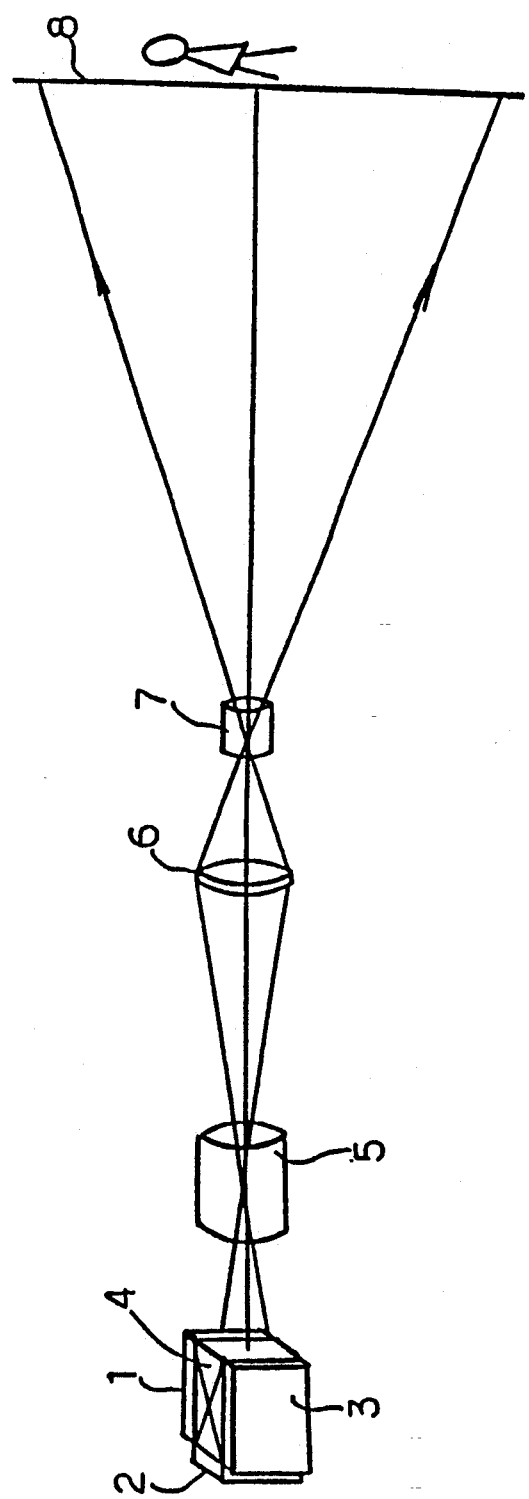
FIG. 1 shows a construction of a conceivable image projector disclosed in the prior application.
Figure 2:
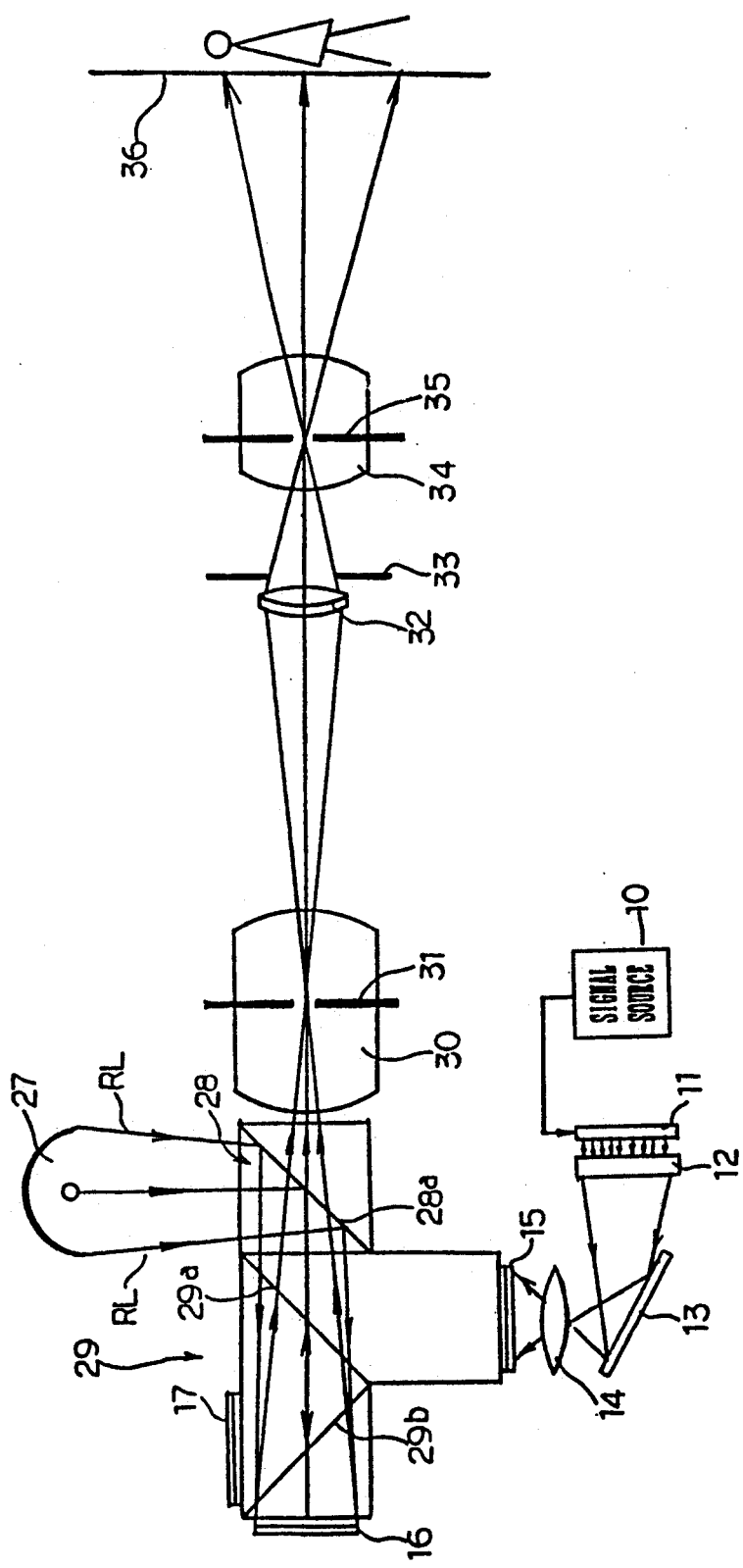
FIG. 2 shows a construction of an image projector according to an embodiment of the present invention.

An embodiment of the present invention will be described with reference to FIG. 2 which shows a construction of a display device of projection type (hereinafter referred to as "image projector") according to a first embodiment of the present invention. In FIG. 2, a signal source 10 produces a time-series television signal of, for example, an NTSC television system, which is supplied to a series-parallel converter circuit 11, such as a shift register, in which the time series video signal is converted into a simultaneously present video signal (simultaneous video signal).

The simultaneous video signal is supplied to light emitting device 12. The light emitting device 12 is composed of a linear array including a plurality of light emitting elements and emits beams of light being intensity modulated correspondingly to the simultaneous video signal. The beams of light emitted from the respective light emitting elements are deflected by a deflector 13 and directed to a spatial light modulator 15 through a lens 14 and thus an image of one of the 3 primary colors is formed on the basis of the incident beams of light.

Concurrently, similar images of other 2 primary colors are also formed on other spatial light modulators 16 and 17, respectively. Electric signal and/or optical systems from the signal source 10 to the spatial light modulators 16 and 17 are identical to that for the spatial light modulator 15, thus details thereof are omitted here.

The spatial light modulators 15, 16 and 17 themselves are also identical to each other and therefore only the spatial light modulator 15 will be described in detail with reference to FIG. 3.

Figure 3:
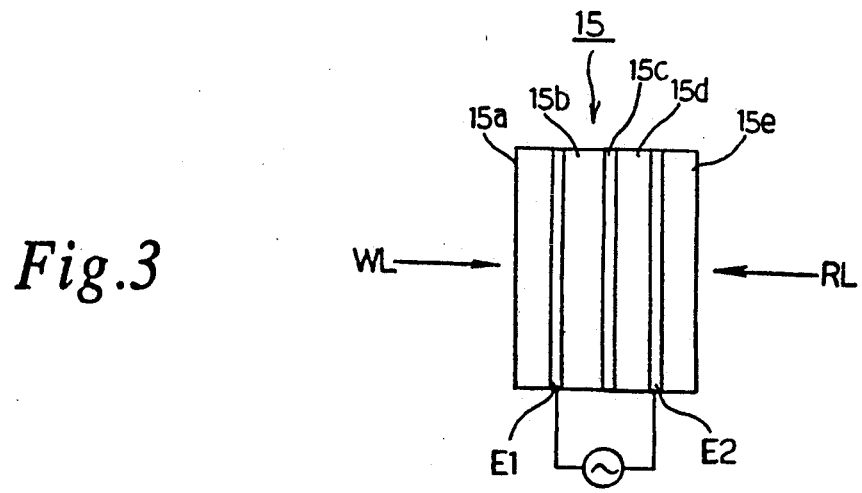
FIG. 3 shows a spatial light modulator in FIG. 2 in more detail.

In FIG. 3, the spatial light modulator 15 is composed of a glass substrate 15a, a transparent electrode E1 formed on one surface of the glass substrate 15a, a photoconductive member 15b, a dielectric mirror 15c, a photo-modulation member 15d which may be of TN (twisted nematic type) liquid crystal or vertically oriented liquid crystal utilizing birefringence effect and a glass substrate 15e having a transparent electrode E2 formed on its surface opposing to the photo-modulation member 15d, all of which are laminated in the described order.

In writing an image information, a voltage is applied between the transparent electrodes E1 and E2 to produce an electric field across the photoconductive member 15b and an image light or writing light WL is directed through the transparent electrode E1. The writing light WL passed through the transparent electrode E1 is incident on the photoconductive member 15b. Electric resistance of the photoconductive member 15b is varied correspondingly with an intensity distribution of the writing light WL over the surface of the photoconductive member 15b.

In reading the image information, a reading light RL is directed to the spatial light modulator 15 from the opposite direction to the writing light WL. The reading light RL passed through the glass substrate 15e reaches the photo-modulation member 15d in which reading light RL is modulated correspondingly with the intensity distribution (written image) of the writing light WL, which may vary when it is representing such as moving pictures, and then the modulated reading light RL reaches the dielectric mirror member 15c and is reflected thereby and emitted out of the spatial light modulator 15 from the side of the glass substrate 15e having the transparent electrode E2.

Returning to FIG. 2, the images formed on the spatial light modulators 15, 16 and 17 are read out by the reading light RL in real time.

The reading light RL is supplied from a light source 27 through a beam splitter 28, where a linearly polarized light (S wave) of the incident light is reflected by a vapor-deposited surface 28a of the beam splitter 28 to a color decomposing/combining optical system 29.

Green light (component) of the linearly polarized light (S wave) is passed through dichroic filters 29a and 29b to the spatial light modulator 16. Red light (component) thereof is passed through the dichroic filter 29a and reflected at a right angle by the dichroic filter 29b to the spatial light modulator 17. Further, blue light (component) thereof is reflected at a right angle by the dichroic filter 29a to the spatial light modulator 15.

As a result, the images formed on the respective spatial light modulators 15, 16 and 17 are read out by these incident reading lights and combined by the color decomposing/combining optical system 29 to produce a beam of three color combined image light.

The beam of combined image light is directed to the polarizing beam splitter 28 and only a P wave component thereof passes therethrough. The beam of image light passed through the polarizing beam splitter 28 is passed through a first lens group 30 having an iris 31 by which a quantity of the image light is restricted, and is focused on an imaginary image formation plane caused by the lens group 30 and arranged to locate in a vicinity of second lens group 32.

An aperture member 33 is provided as a mask device behind and in the vicinity of the second lens group 32 i.e. in a proximity of the imaginary image formation plane. The aperture member 33 serves to cut out a peripheral unnecessary area in cross section of the image light passing therethrough.

Figure 4:
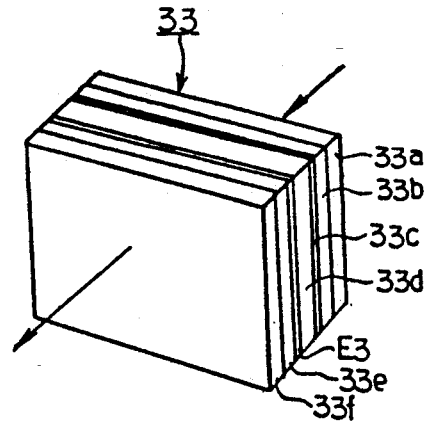
FIG. 4(A) is a perspective view of an aperture member in FIG. 2.
FIG. 4(B) is a plan view of an aperture of the aperture member in FIG. 4(A)
Figure 4:
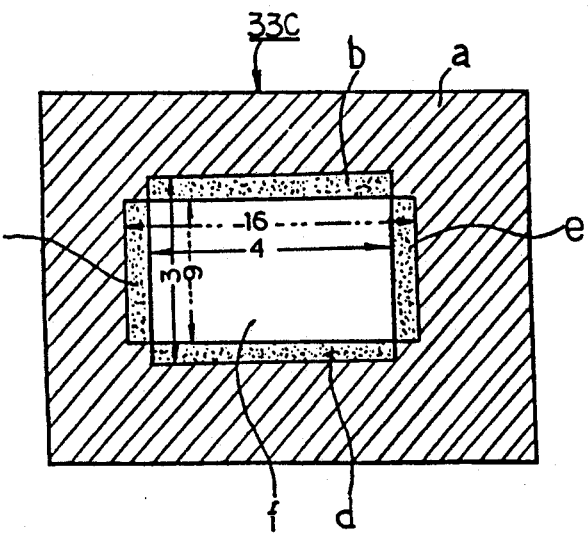

FIG. 4(A) is a perspective view of the aperture member 33. As shown in FIG. 4(A), the aperture member 33 takes a form of lamination of a glass substrate 33a, a polarizing plate 33b capable of passing only P wave component, an aperture portion 33c, a TN liquid crystal 33d, a transparent electrode E3, a polarizing plate 33e capable of passing only S wave component and a glass substrate 33f, in this order.

FIG. 4(B) is a plan view of the aperture portion 33c of the aperture member 33 shown in FIG. 4(A). In FIG. 4(B), the aperture portion 33c includes a hatched area "a" as a shielding portion, dotted areas "b", "c", "d" and "e" as transparent electrode portions and an open area "f" as an open portion. A rectangular area formed by the open portion "f" and the transparent electrode portions "b" and "d" has an aspect ratio of 3:4. A rectangular area formed by the open portion "f" and the transparent electrode portions "c" and "e" has an aspect ratio of 9:16.

Assuming that the image light incident on the aperture member 33 is of NTSC system in which the aspect ratio is 3:4, a voltage is applied to the transparent electrode portions "b" and "d" with respect to a potential of the transparent electrode E3 leaving the transparent electrodes "c" and "e" unbiased. Thus, portions of the TN liquid crystal 33d corresponding to the areas of the transparent electrode portions "b" and "d" allow light to pass through while portions thereof corresponding to the areas of the transparent electrode portions "c" and "e" do not.

Therefore, any unnecessary peripheral portions of the image light incident on the aperture member 33 is shielded, allowing only the necessary image light having aspect ratio of 3:4 to pass through.

The necessary image light passed through the aperture member 33 is incident on a third lens group 34 and restricted in area by an iris 35 thereof. After enlarged by the third lens group 34, the optical image is projected onto a screen 36.

Accordingly, the image projected on the screen 36 is well defined at its fringe having the aspect ratio of 3:4 due to removal of unnecessary portions by the aperture member 33.

When the video signal from the signal source 10 is not the NTSC television signal but another television signal having an aspect ratio of 9:16, a switch (not shown) for changing the aspect ratio is operated causing that the voltage applied to the transparent electrode portions "b" and "d" is removed with respect to the potential of the transparent electrode E3, and concurrently a voltage is applied to the transparent electrode portions "c" and "e" with respect to the transparent electrode E3.

In this case, the portions of the TN liquid crystal 33d corresponding to the transparent electrode portions "c" and "e" allow light to pass through while portions thereof corresponding to the transparent electrode portions "b" and "d" do not.

Therefore, as in the previous case, the image having a well defined fringe area or frame of aspect ratio of 9:16 is projected onto the screen 36.

Instead of the TN liquid crystal 33d, a polymer containing liquid crystal in dispersed state (PDLC) can be used for this purpose. Further, a transparent electrode may be formed to cover a full area of the open portion "f" of the aperture portion 33c so that it functions as a projection shutter capable of blocking a projected light operating in conjunction with the other portions "b" "c" "d" "e".

Figure 5:
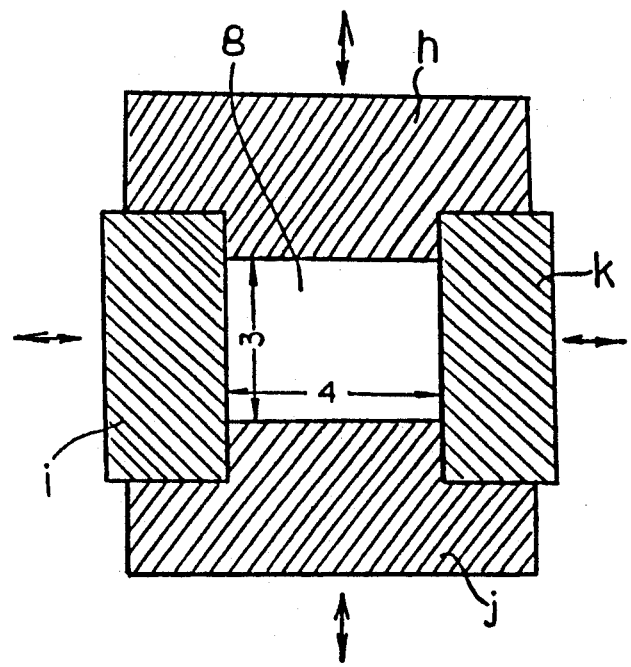
FIG. 5 shows an aperture of the aperture member according to another embodiment of the present invention.

FIG. 5 shows another embodiment of the aperture member 33. In FIG. 5, an open portion "g" is formed by four shielding plates "h", "i", "j" and "k" which are movable in directions shown by double head arrows as such that, in a normal state before moving, the open portion "g" has an aspect ratio of 3:4 and, at a completion of the movement of the shielding plates, its aspect ratio becomes 9:16.

This embodiment can be realized without using any special structure. For example, it may be realized by a conventional system using stepping motors.

Figure 6:
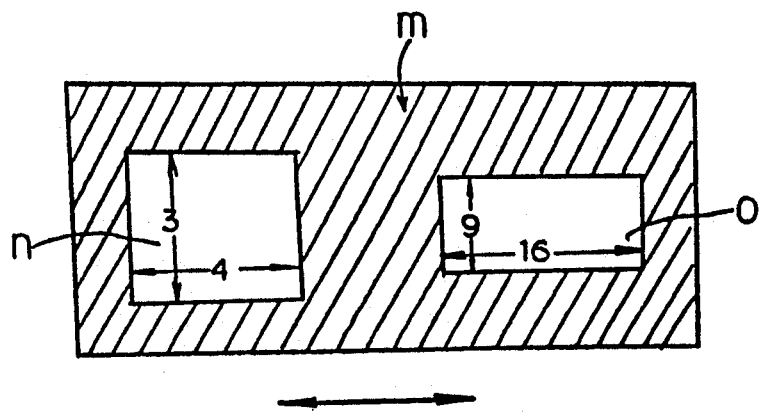
FIG. 6 shows an aperture member 33 according to a further embodiment of the present invention.

FIG. 6 shows a further embodiment of the aperture member 33. In FIG. 6, the aperture member 33 takes the form of a slidable shielding plate "m" having an opening "n" having an aspect ratio of 3:4 and another opening "o" having an aspect ratio of 9:16. The aperture member 33 shown in FIG. 6 is moved as shown by a double head arrow according to an input signal. This embodiment can be realized easily without using any special structural components as in the case shown in FIG. 5.

It should be noted that, although the configuration of the aperture portion has been described as rectangular having aspect ratio of 3:4 or 9:16, the present invention is not limited thereto. The present invention can be applied to various image information by changing the size and/or configuration of the open portion (light passing portion) of the light shielding plate.

Further, in the described embodiments, the kind of signal information from the signal source 10 is visually monitored by an operator and the present aperture member is operated manually by turning the switch ON or OFF, however, it is possible to operate the aperture member of the present invention automatically. That is, connectors are provided correspondingly with the respective signal sources so that the switch is turned ON when a connector corresponding to a specific signal source is connected to apply a voltage to the transparent electrode portions "b" and "d" or "c" and "e" with respect to the transparent electrode E3, or to move any of the slidable shielding plates.

Further, it is also possible to detect electrically or optically a type of the signal, and upon the detection the light shield configuration is changed automatically according to the aspect ratio required for the type of the signal. By doing above mentioned alternatives, any manual operational error or inconvenience in the manually operating switch, or the like can be removed.

As described in the foregoing, according to the projection type display device of the present invention, it is possible to trim out unnecessary portion of an image light correspondingly with different frame forms (aspect ratio) of a video signal and therefore it is possible to project an image onto a screen with high contrast and with well defined frame.

Accordingly, the projection type display device of the present invention, in which an image information written in spatial light modulators is read out as an optical image by means of a light source and the optical image is projected through lens groups, is featured by comprising a mask provided in the vicinity of one of the lens groups for cutting off unnecessary light contained in a projecting light beam carrying the optical image and wherein portions of the light beam to be cut off by the mask is variable, it is possible to trim out unnecessary portion of the light beam which corresponds to a video signal even if its frame configuration is different depending on a type of the video signal and therefore it is possible to project an image onto a screen with high contrast and with well defined fringe.

What is claimed is:

1. A projection type display device wherein an image information written in spatial light modulation means is read out as an optical image in a form of light beam by means of a light source and said light beam is projected out of said display device for forming a projected image on a screen, said display device comprising:
   a lens system comprising at least a first lens group, a second lens group and a third lens group each disposed along an optical axis in the order named, said first lens group being positioned so as to form a light image nearby said second lens group and said second lens group being positioned so as to converge the light beam from said first lens group into the third lens group, and said third lens group being positioned so as to project the light image on the screen as a magnified image; and
   mask means disposed in a proximity of the light image formed nearby the second lens group, said mask means having a variable light shielding configuration for cutting off unnecessary parts of the light image to be displayed on the screen, so that the projected image on the screen has a clear frame corresponding to the variable light shielding configuration of the mask means.

2. A projection type display device claimed in claim 1 in which said mask means comprises a mask having an opening defined in said mask, shutter means covering said opening for controllably blocking said light beam passing therethrough.

3. A projection type display device claimed in claim 1 in which said variable light shielding configuration is square and an aspect ratio thereof is changed correspondingly with said image information.

4. A projection type display device, wherein an image information written in spatial light modulation means is read out as an optical image in a form of light beam by means of a light source and said light beam is projected out of said display device through lens groups for forming a projected image, said display device comprising:
   an imaginary image formation plane arranged in a vicinity of one of said lens groups, said light beam forming an image on said imaginary image formation plane by other one of said lens groups;
   mask means disposed in a proximity of said imaginary image formation plane, said mask means having a variable light shielding configuration for cutting off unnecessary light component of said light beam carrying said optical image, said variable light shielding configuration being square and an aspect ratio thereof being changed correspondingly with said image.

* * * * *